May 1, 1934. J. A. McKINNON 1,957,347
FRACTIONAL RETORT
Original Filed Nov. 24, 1931 2 Sheets-Sheet 1
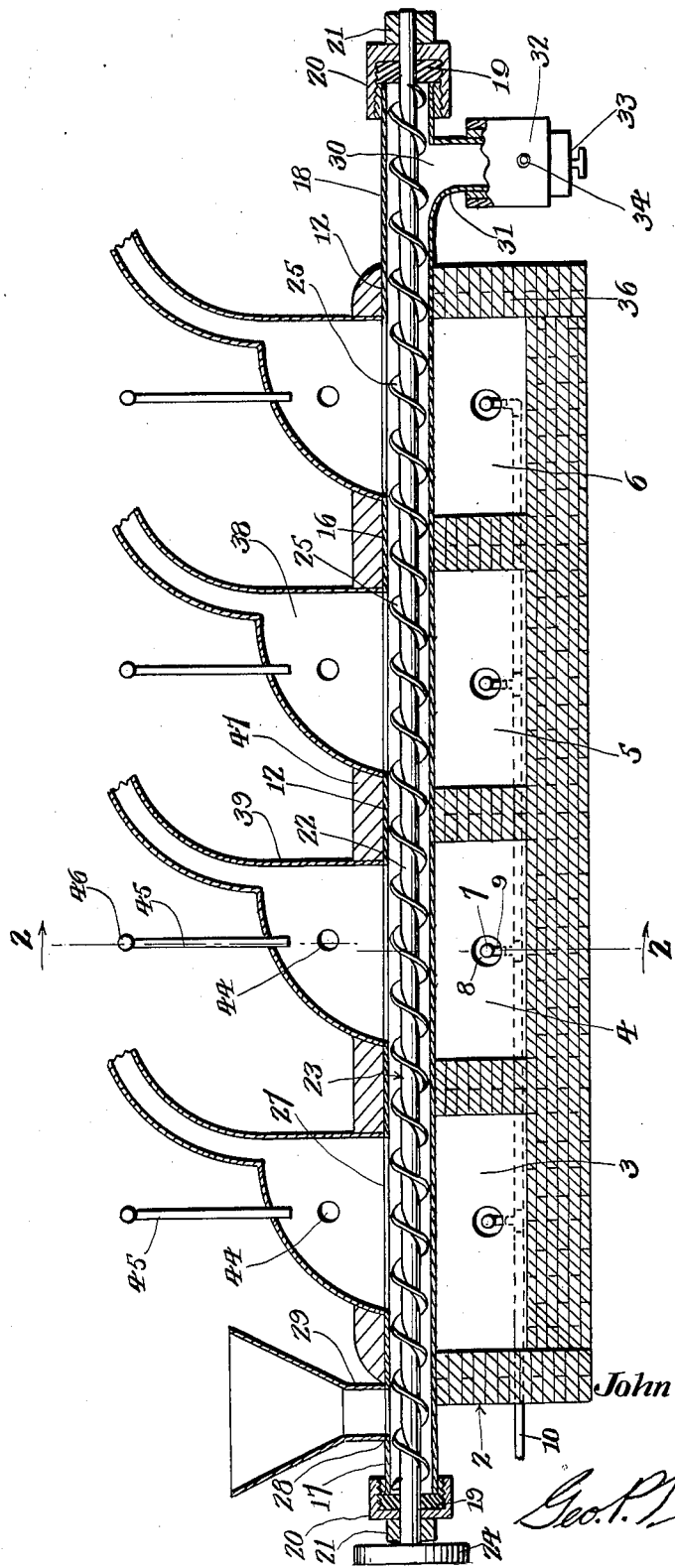
Inventor
John A. McKinnon
Geo. P. Kimmel
Attorney

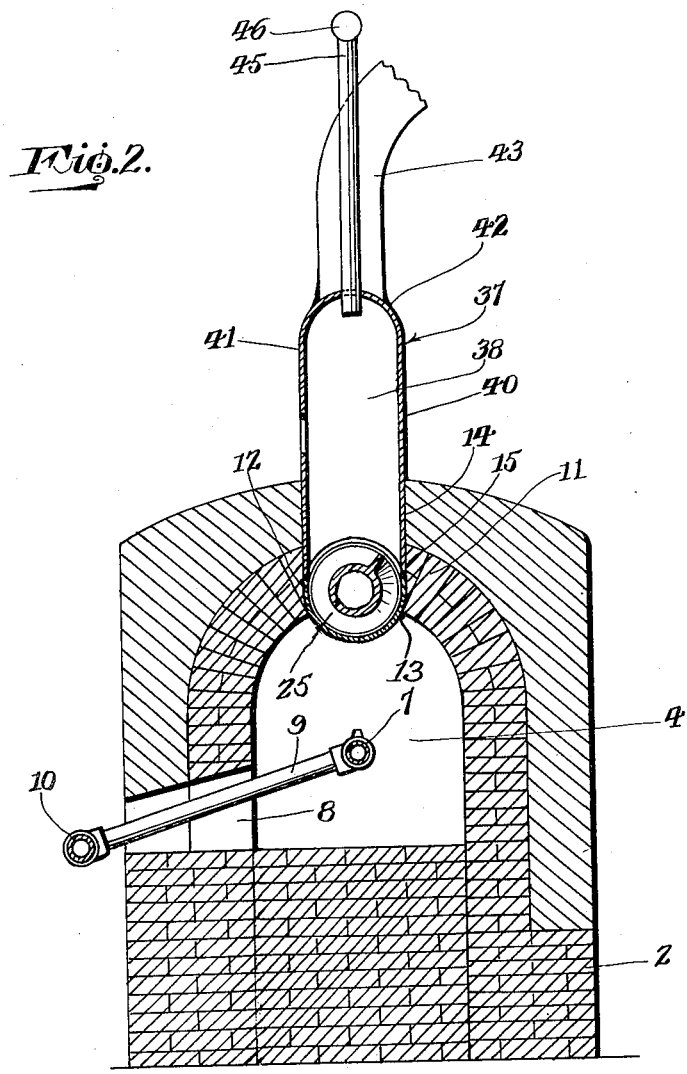

Patented May 1, 1934

1,957,347

UNITED STATES PATENT OFFICE 1,957,347

FRACTIONAL RETORT

John A. McKinnon, Seattle, Wash., assignor to Fractional Retort, Inc., Seattle, Wash., a corporation Application November 24, 1931, Serial No. 577,094
Renewed September 2, 1933

3 Claims. (Cl. 263—25)

My invention relates to a fractional retort.

The essential objects of my invention are to provide in a manner as hereinafter set forth a fractional retort for roasting minerals and ores, for extracting the volatile substances therefrom and leaving the ores, after being roasted free from any binding elements or substances; including a series of spaced, independent gas chambers arranged tandemwise progressively increasing in temperature and through which the material to be acted upon is continuously passed, the arrangement being such that the first chamber through which the material passes will remove the moisture and light gas out, the second chamber having a higher temperature will take the next heavier gas out and so on until the material that has passed through the retort is practically free of any gases or volatile substances and ready for treatment by cyanide or in a smelting furnace; for carrying off the fumes, gases and volatile substances from each chamber independently for discharge into a condenser where oxidization takes place; and to attain these ends in a strong, durable, compact, thoroughly efficient and comparatively inexpensive structure.

To the above ends my invention consists of such parts, and such combination of parts which fall within the scope of the invention as claimed.

In the drawings:

Figure 1 is a longitudinal sectional view of a fractional ore roasting retort in accordance with my invention.

Figure 2 is a section on line 2—2, Figure 1.

The retort includes a supporting structure 2 provided with a series of independent fire-boxes of any desired number, but they must correspond in number to that of a series of gas chambers or heat domes for the reception of gases and volatile substances given off from the material being treated. As illustrated, by way of example the retort is set up with four gas chambers and these latter will be hereinafter referred to. The fire-boxes are indicated at 3, 4, 5 and 6. Within each fire-box is arranged a gas burner 7 disposed centrally thereof. Each fire-box is formed with an opening 8 in its front wall for the passage of a branch supply pipe 9 which leads from a main gas supply line 10 to the burner 7. The line 10 is arranged exteriorly of the front of the fire-boxes and is connected to a source of gas supply, not shown.

The dome of each fire-box is indicated at 11. The structure 2 has a lengthwise extending channel 12 centrally of its top. The bottom wall of such channel, at spaced portions of its length, as at 13 is cutaway for communication with the fire-boxes centrally of the domes of the latter. The top of structure 2 has spaced lengthwise extending cutouts 14, which align with spaced lengthwise extending cutouts 15 formed in the top of the wall of the channel 12.

Extending through the channel 12, as well as projecting from each end thereof is a fixed tubular member 16. One projecting end portion of the latter is indicated at 17 and the other at 18. Secured against the edge of end portions 17 and 18 are apertured sealing elements 19 maintained in position by axially apertured caps 20 having threaded engagement with the periphery of end portions. Collars 21 abut against the caps 20 and are fixed to a hollow operating shaft 22 for a revoluble screw conveyor element 23.

The shaft 22 extends through and is of greater length than member 16. That end of the shaft 22 which projects from end portion 17 is provided with a driving pulley 24 operated from a prime mover, not shown. The screw of element 23, indicated at 25, is fixed to shaft 22 and extends from one sealing element 19 to the other. The member 16 has its top formed with spaced lengthwise cutouts 27 to provide for communication between the interior of the member 16 and the gas chambers to be referred to. The top of end portion 17 of member 16 has an opening 28 and to the wall of the latter is secured an upstanding feed hopper 29. The bottom of end portion 18 is provided with an opening 30 and communicating with the latter, as well as depending from member 16, is a conducting off pipe 31 for discharging the roasted material into an air tight container 32 provided with a discharge device 33 and said container may also be provided with pipe connections 34 leading to a condensing system drawing out gases and volatile substances.

Each cutout 14 aligns with a cutout 15. The cutouts 15 align with the cutouts 13. Positioned in each cutout 14 and extending into the cutout 15 which aligns with the latter is an open bottom casing or container 37 and extending across its open bottom and upwardly in casing 37 is the tubular member 16. Each cutout 27 of member 16 opens into a casing 37 and the latter provides a gas chamber or heat dome 38.

Each casing 37 includes a side wall 39, a front wall 40, a rear wall 41 and a top 42 of concave-convexed cross section. The walls 40, 41 gradually increase in height from one end in a direction to the wall 39. The tops of the walls 40, 41 are curved. By this arrangement casing 37 gradually increases in height in a direction towards wall 39. The casing 37 at its highest point is formed with a pipe 43 leading to condensers or oxidizing system. The wall 41 is formed with an opening 44 for a thermostatic control communicating with chamber 38. A pipe 45 opens through the wall 42 for keeping a pyrometer 46 therein so as to have the temperature of the chamber 38 under constant observation. The length of chamber 38 is greater than the width thereof. The length and width of the open bottom of casing 37 vary according to the different sizes of the retorts.

The chambers 38 can be heated by oil, gas or electricity, but the heated agent is referred to by way of example as gas. The burners 7 are to be of the adjustable type for the purpose of progressively increasing the temperatures of the chambers 38.

The sides of and top of structure 2 is formed of heat retaining material 47.

It is well known that where there is sulphur, arsenic and antimony mixed in the ores they cannot be separated successfully without roasting. After the ores are crushed or ground and supplied to the hopper they are conveyed through the several gas chambers, the first gas chamber or heat dome will take the moisture and light gas out. The material is fed continuously so as to fill all space between the chambers so as to stop the escape of gas from one chamber to another. The second chamber having a higher temperature of heat will take the next heavier gas out and so on until the material has passed through the retort into the air tight container, practically free from any gases or volatile substance and ready for cyanide or a smelting furnace.

The fumes, gases and volatile substance coming from the gas chambers are then carried through pipes from the gas chambers to their respective condensers where an oxidization takes place. Each oxide is kept separate and not mixed with the other, and oftentimes high values are recovered from the oxides as well as from the tailings of the ores through this process of roasting.

What I claim is:—

1. An ore roasting furnace comprising, a rectangular structure providing a plurality of spaced fire boxes arranged tandemwise, each fire box having a vertical opening in its dome, said structure having its top portion formed with vertical, spaced upper cutouts aligning with said openings, a tubular member arranged within, extending lengthwise and from the ends of said top portion and across said openings, said member having its top formed with spaced lengthwise extending cutouts aligning with said upper cutouts, a plurality of open bottom casings forming a plurality of open bottom gas chambers, each of said casings mounted in an upper cutout and extending above the top of said structure, said member extending through the lower portion of said casings and having the cutouts therein establishing communication between the interior thereof and said chambers, a revoluble material conveyor device of the screw type extending through said member, a material feed hopper opening into one end of said member, and a material conducting-off pipe leading from the other end of said member.

2. An ore roasting furnace comprising, a rectangular structure providing a plurality of spaced fire boxes arranged tandemwise, each fire box having a vertical opening in its dome, said structure having its top portion formed with vertical, spaced upper cutouts aligning with said openings, a tubular member arranged within, extending lengthwise and from the ends of said top portion and across said openings, said member having its top formed with spaced lengthwise extending cutouts aligning with said upper cutouts, a plurality of open bottom casings forming a plurality of open bottom gas chambers, each of said casings mounted in an upper cutout, and extending above the top of said structure, said member extending through the lower portion of said casings and having the cutouts therein establishing communication between the interior thereof and said chambers, a revoluble material conveyor device of the screw type extending through said member, a sealing means for each end of said member, a material feed hopper opening into said member in proximity to the sealing means at one end of the latter, and an air tight container opening into and depending from said member in proximity to the sealing means at the other end of the latter.

3. An ore roasting furnace comprising, a rectangular structure providing a plurality of spaced fire boxes arranged tandemwise, each fire box having a vertical opening in its dome, said structure having its top portion formed with vertical, spaced upper cutouts aligning with said openings, a tubular member arranged within, extending lengthwise and from the ends of said top portion and across said openings, said member having its top formed with spaced lengthwise extending cutouts aligning with said upper cutouts, a plurality of open bottom casings forming a plurality of open bottom gas chambers, each of said casings mounted in an upper cutout and extending above the top of said structure, said member extending through the lower portion of said casings and having the cutouts therein establishing communication between the interior thereof and said chambers, a revoluble material conveyor device of the screw type extending through said member, each of said casings gradually increasing in height from one end to the other and provided at the highest end thereof with a conducting-off pipe.

JOHN A. McKINNON.